Dec. 2, 1969  O. J. ADLHART  3,481,787
FUEL CELL COMPRISING A RANEY CATALYST ALLOY CONSISTING
OF PLATINUM AND A MEMBER SELECTED FROM THE GROUP
CONSISTING OF ZIRCONIUM, TUNGSTEN AND RHENIUM
Filed June 11, 1964
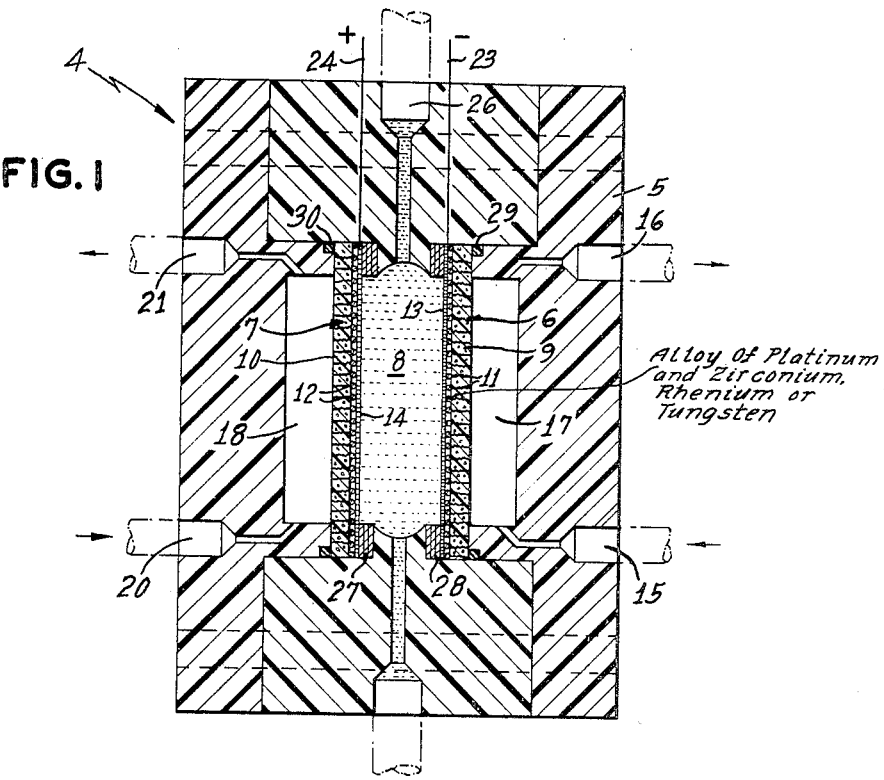
FIG. I
Alloy Of Platinum
and Zirconium,
Rhenium or
Tungsten
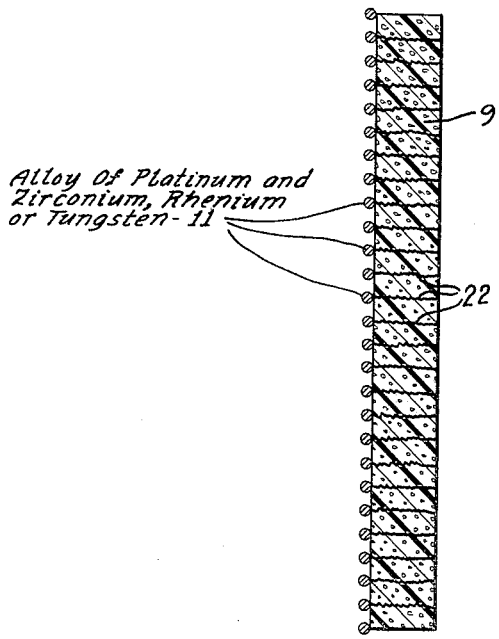
Alloy Of Platinum and
Zirconium, Rhenium
or Tungsten - 11
FIG. 2
INVENTOR.
Otto J. Adlhart
BY
Roger J. Drew
ATTORNEY United States Patent Office 3,481,787
Patented Dec. 2, 1969

3,481,787
FUEL CELL COMPRISING A RANEY CATALYST ALLOY CONSISTING OF PLATINUM AND A MEMBER SELECTED FROM THE GROUP CONSISTING OF ZIRCONIUM, TUNGSTEN AND RHENIUM
Otto J. Adlhart, Newark, N.J., assignor to Engelhard Industries, Inc., Newark, N.J., a corporation of Delaware
Filed June 11, 1964, Ser. No. 374,333
Int. Cl. H01m 27/08
U.S. Cl. 136—86                                    6 Claims

ABSTRACT OF THE DISCLOSURE

This disclosure pertains to fuel cells using catalytic anodes which lessen polarization losses. Alloys of platinum and a base metal are effective fuel cell anode catalysts. The particular base metals found useful for combination with the platinum are zirconium, rhenium and tungsten.

---

This invention relates to fuel cells and more particularly to fuel cells equipped with new and improved fuel electrodes. Additionally, this invention is concerned with the fuel electrode per se, and the production of electrical energy utilizing such fuel cells.

Fuel cells are well known as devices for the direct conversion of a fuel to electrical energy. A fuel cell basically comprises a fuel electrode and an oxidizer electrode, and an electrolyte which acts as an ion transferring medium. Organic fuels have been utilized heretofore as reactants at the fuel electrode. Such fuels have included normally gaseous hydrocarbons and oxygenated hydrocarbons, for instance methanol.

However the use of the organic fuel methanol or a normally gaseous hydrocarbon with acid electrolytes and with a catalyst at the fuel electrode such as platinum alone has resulted in a strong anodic polarization under load, i.e. during current withdrawal. The result has been a severe reduction in the overall power output of fuel cells having such catalytic fuel electrodes.

In accordance with the present invention, it has now been found that fuel cells having an anodic polarization materially lower than that of the prior art fuel cells having the catalytic fuel electrode previously mentioned herein and operating with organic fuels are provided by reason of the new and improved fuel electrode of this invention. The fuel electrode, i.e. anode, of the present invention is a catalytic electrode and comprises as catalyst essentially an alloy of platinum and either zirconium, rhenium or tungsten. Such electrode is characterized by providing a materially higher level of catalytic activity than the aforementioned prior catalytic fuel electrodes having as catalyst platinum alone. Consequently, cells equipped with the fuel electrodes of this invention can be operated at the important higher current densities with organic fuels and with appreciably lower anodic polarization than can the prior art cells having platinum alone as anode catalyst.

The catalyst of this invention can be either unsupported or supported on a suitable substrate. When unsupported, it can be in the form of a self-sustaining disc or sheet formed by compacting a mass of the alloy particles in a die by application of pressure. When supported, the alloy can be applied and adhered to the surface of metallic structures such as sheets, grids or other porous structures or non-metallic structures such as, for instance, structures of carbon, graphite, plastics and the like. One form of such supported alloy catalyst is the alloy dispersed on a high surface carrier, for example activated carbon powder. Such alloy on activated carbon powder is then adhered to a structural substrate. The surface area of the carrier is typically 50–1500 m.$^2$/g.

The cathode, i.e. the oxidizer or oxidizing gas electrode, can be a catalytic or non-catalytic electrode. When a catalytic cathode is utilized, a platinum group metal, for instance platinum or palladium, is deposited in finely divided form on the supporting substrate.

The process for production of electrical energy in accordance with this invention comprises, in its broader aspects, contacting a catalytic fuel electrode of a fuel cell with an organic fuel hereinafter disclosed, the fuel electrode comprising as catalyst a binary alloy of platinum and either zirconium, rhenium or tungsten and being in contact with an acid electrolyte, and contacting the oxidizer electrode of the cell with an oxidizer or oxidizing gas, for instance $O_2$, the oxidizer electrode also being in contact with the electrolyte. The fuel electrode and oxidizer electrode are each in contact with an acid electrolyte. Consequently the fuel reacts electrochemically at the anode with the release of electrons which are carried off by an electrically conductive member of an external circuit, and the oxygen reacts electrochemically at the cathode with the electrons supplied from the external circuit, so that a continuous electric current results. The negatively charged oxygen ions then migrate through the electrolyte to the anode for the electrochemical reaction at such electrode.

The organic fuel, for instance an oxygenated hydrocarbon, e.g. a lower aliphatic alcohol, is contacted in gaseous or vapor phase with the electrolyte by passage within communicating pores of a gas-pervious fuel electrode of this invention comprising the alloy of platinum and one of the other metals mentioned previously herein on a porous supporting substrate. Alternatively the fuel is dissolved in the electrolyte, wherein it contacts the catalytic fuel electrode. The oxidizer, for instance an oxygen-containing gas such as air, is contacted with the electrolyte by passage within communicating pores of a gas-pervious oxidizing electrode.

The platinum-zirconium, platinum-rhenium or platinum-tungsten alloys of this invention can be prepared by melting the two metals of the particular alloy desired in proportions corresponding to that desired in the product alloy together with a third component capable of being readily leached out of the resulting alloy, for instance aluminum or silicon. The melting of the three components can be done in a gas-fired or electrical furnace. The resulting alloy, after removal from the furnace and cooling solidification, is treated with caustic, for instance by immersion in potassium hydroxide or sodium hydroxide aqueous solution of, for instance, 10% caustic concentration, to leach or dissolve out the aluminum or silicon. If desired the leaching can be effected by treatment with acid. The resultant binary or substantially binary alloy is obtained as a powder. In this preparation method, the aluminum or silicon is usually present in major amount, with the platinum and the zirconium, rhenium or tungsten present in minor amount. Thus a typical alloy prior to the leaching contains, by weight, 85% aluminum and 15% total platinum and one of the other metals aforementioned. Alloys produced by this method are commonly referred to as Raney alloys.

The supported alloy catalysts of this invention can be prepared by various methods. One method involves the application and adherence of alloy in powder form and prepared by the method hereinbefore disclosed to the support. When "Teflon" is the supporting substrate, the alloy powder particles are pressed into the surface of the "Teflon" at normal temperature by means of a suitable press, for instance a hydraulic press, thereby to adhere to such support. When an ion exchange membrane fabricated of, for instance polystyrene sulfonic acid, is the support, the alloy powder is pressed into the membrane surface to adhere to such support with the membrane surfaces maintained at an elevated pressure, suitably about 100° C.

The fuel herein is a lower aliphatic alcohol or a normally gaseous, liquid or solid hydrocarbon, for instance an aliphatic alcohol, e.g. a lower alkanol containing from 1–3 carbon atoms inclusive per molecule, a straight chain alkane hydrocarbon having from 1–20 carbon atoms inclusive per molecule, e.g. methane, ethane, propane, butane, pentane, hexane, heptane, octane, nonane, decane and so forth, or sugar.

The platinum-zirconium alloys of this invention contain, by weight, about 50–99 percent of platinum and about 50–1 percent of zirconium; the platinum-rhenium alloys contain, by weight, about 50–99 percent of platinum and about 50–1 percent of rhenium; and the platinum-tungsten alloys contain, by weight, about 50–99 percent of platinum and about 50–1 percent of tungsten.

The electrolyte herein is an acid electrolyte, for instance aqueous sulfuric acid solution, e.g. aqueous sulfuric acid solution of 5% to 80% by weight concentration, or aqueous phosphoric acid or hydrochloric acid of similar concentration.

The fuel cells of this invention may be operated at ambient conditions but preferably are operated at elevated temperatures in the range of about 50° C.–300° C. Heat may be applied from an outside source for start-up and, if necessary, during the course of the cell operation for instance by steam supplied to a suitable steam jacket. The temperature of the cell may be controlled, for instance, by means of the amount of insulation material utilized, or by circulation of cooling air or other cooling gas about the cell.

Reference is now made to the accompanying drawings wherein:

FIGURE 1 is a longitudinal section through a fuel cell of this invention; and

FIGURE 2 is an enlarged section through a fuel electrode of this invention.

Referring to FIGURE 1, fuel cell 4 comprises container 5 of "Teflon" or other material of low electrical conductivity, porous electrodes 6 and 7 of opposing polarity therein and respectively the fuel electrode and oxidizer electrode, and liquid acid electrolyte 8 contacting opposed surfaces of electrodes 6 and 7. Electrodes 6 and 7 are each made up of a porous non-catalytic substrate or support 9 and 10 respectively, for instance a sheet of porous "Teflon" sponge. Fuel electrode 6 is gas pervious and has permeable catalyst layer 11 of the binary alloy of this invention of platinum and either zirconium, rhenium or tungsten adhered to the support, and gas pervious oxidizer electrode 7 also has a permeable catalyst layer 12 of platinum alone adhered to the support. In addition to the catalyst being adhered to the exterior surface of supports 9 and 10 of electrodes 6 and 7, some of the catalyst is on the walls defining accessible pores of the porous supports or substrates 9 and 10. A three phase boundary of catalyst, electrolyte and gaseous fuel is provided in the pores of substrate 9 of fuel electrode 6, where the catalyst surface contacts the menisci of the electrolyte and the gaseous fuel. Single ply platinum gauze sheet 13 is in face to face contact with catalyst layer 11 for collection and withdrawal of electric current, and single ply platinum gauze sheet 14 is in face to face contact with catalyst layer 12 for supplying electrons to the oxidizer electrode for the electrochemical reaction with the oxyen. The connection to the conventional reference electrode (not shown) is designated at 26. Annular members 27 and 28 of gold and O-rings 30 and 29 of neoprene rubber serve to respectively maintain the gauze sheets 14 and 13 in contact with the catalyst layers and to seal the assembly.

Fuel inlet and outlet 15 and 16 respectively enable supply of fuel in gaseous form into anode compartment 17 and the outflow of gaseous reaction products from such compartment.

An oxidizing gas is introduced into cathode compartment 18 through inlet 20 and the cathode effluent evolves through outlet 21. Exemplary of such gas is an oxygen-containing gas, e.g. air, or oxygen per se, preferably air.

One fuel electrode of this invention is shown in more detail in FIGURE 2. Pores 22 of porous supporting substrate 9 communicate opposite sides of support 9. An alloy catalyst of this invention is supported on substrate 9 as a liquid-permeable layer 11 of powder particles with some of the catalyst on the walls defining the accessible pores of porous substrate 9, as previously disclosed herein. A current collecting and withdrawal member such as the platinum gauze sheet 13 shown in FIGURE 1 will contact catalyst layer 11 for the purpose stated.

Electrically conductive elements 23 and 24 are connected to the upper portion of the platinum gauze current collectors 13 and 14 respectively. Conductive elements 23 and 24 are connected in an external circuit with a suitable resistance, for instance an incandescent lamp (not shown), and the flow of current in such circuit due to the flow of electrons resulting from the electrochemical reaction within the fuel cell, results in the lamp being energized and lighting up.

The invention is further illustrated by reference to the following examples wherein different materials were evaluated as fuel electrode catalyst by a half cell evaluation procedure. This procedure is especially convenient for rapid and unambiguous determination of differences in anode polarization, as any limitations due to cathode polarization or resistance polarization are eliminated. Such a half cell evaluation procedure is described in J. Electrochem. Soc. 109, 553 (1962). The half cell method used to evaluate the catalysts of this invention was similar except that an Ag/AgCl reference electrode was used instead of the calomel electrode. Percentages are by weight unless otherwise specified.

EXAMPLE I

A platinum-zirconium alloy was prepared by a procedure in which a melt was prepared containing 85% aluminium and 15% total for the platinum and zirconium, with the platinum content of the total platinum and zirconium being 80 weight percent and the zirconium content 20 weight percent. After solidification of the melt the aluminum was removed by treating with 10% NaOH aqueous solution at 80° C., and the platinum-zirconium alloy was obtained in the form of a powder. The half cell used for testing such alloy and also the single metals platinum black, ruthenium and rhodium as fuel electrode catalyst, was operatively connected to a counter electrode of platinum. The electrolyte was 2 N $H_2SO_4$ aqueous solution and the fuel was 2 volume percent $CH_3OH$ dissolved in the electrolyte. The following Table I sets forth the test results at cell operating temperature of about 100° C.

TABLE I

| Catalyst Composition | Potential in Volts vs. STHE at the Indicated Current Density in mA./cm.[2] | | | | |
|---|---|---|---|---|---|
|  | 0 | 5 | 20 | 50 | 100 |
| Pt black per se | .16 | .37 | .44 | .49 | .55 |
| Ru per se | .24 | .44 | .51 | .62 |  |
| Alloy of Pt 80%-Zr 20% | .10 | .31 | .37 | .42 | .48 |
| Rh per se | .19 | .37 | .46 | .54 |  |

The superiority of the Pt-Zr alloy of this invention as fuel electrode catalyst over Pt black alone, ruthenium alone and rhodium alone both at open circuit potential and relatively low and high current densities is shown by the date of Table I. "STHE" in Table I means standard hydrogen electrode. Percentages of the alloy constituents in Table I and Tables II–IV which follow are by weight.

EXAMPLE II

Test runs were conducted for the purpose of evaluating a number of platinum-rhenium alloys as fuel electrode catalyst, and also rhenium alone and platinum black alone as fuel electrode catalyst. The half cell mentioned in Example I was utilized and was operatively connected to a platinum counter electrode. The electrolyte was a 2 N $H_2SO_4$ aqueous solution, and the fuel was 2 volume percent methanol dissolved in the electrolyte. The cell was operated at a temperature of about 90° C.–100° C. in each test. The following results were obtained.

TABLE II

| Catalyst Composition (percentages by weight) | Potential in Volts at the Indicated Current Density in mA./cm.$^2$ | | | | |
|---|---|---|---|---|---|
| | 0 | 5 | 20 | 50 | 100 |
| Alloy of Pt 90%-Re 10% | .13 | .27 | .34 | .43 | .51 |
| Alloy of Pt 67%-Re 33% | .13 | .23 | .31 | .44 | |
| Alloy of Pt 80%-Re 20% | .12 | .24 | .29 | .37 | .44 |
| Re per se | .28 | .35 | .44 | .57 | |
| Pt black per se | .16 | .37 | .44 | .49 | .55 |

The date of Table II shows the superiority of the platinum-rhenium alloys of this invention as fuel electrode catalyst over rhenium alone and platinum black alone as such catalyst, both at open circuit potential and relatively low and high current densities.

EXAMPLE III

Tests were also carried out to evaluate a platinum-tungsten alloy as fuel electrode catalyst and to compare the alloy with platinum black alone as fuel electrode catalyst. The half cell mentioned in Example I was utilized, and was operatively connected to a platinum cathode. The electrolyte was 2 N $H_2SO_4$ aqueous solution, the fuel was 2 volume percent methanol dissolved in the electrolyte, and the cell was operated at a temperature of about 95° C. The following results were obtained

TABLE III

| Catalyst Composition | Potential in Volts at the Indicated Current Density in mA./cm.$^2$ | | | |
|---|---|---|---|---|
| | 0 | 20 | 50 | 100 |
| Pt black per se | .16 | .44 | .49 | .55 |
| Alloy of Pt 67%-W 33% | .16 | .38 | .44 | .50 |
| Mechanical mixture of Pt 40%-W 60% | .26 | .46 | .50 | .55 |
| Mechanical mixture of Pt 65%-W 35% | .26 | .46 | .51 | .56 |

The superiority of the platinum-tungsten alloy of this invention over platinum black alone and mechanical mixtures of platinum and tungsten as fuel electrode catalyst at both low and high current densities is shown by the data of Table III.

What is claimed is:

1. A fuel cell comprising an oxidizer electrode, a catalytic fuel electrode, and an acid contacting a surface of each electrode, the catalyst of the fuel electrode being a Raney alloy formed as a powder and consisting essentially of about 50–99% platinum and about 1–50% a material selected from the group consisting of zirconium, rhenium and tungsten, means for supplying an oxidizing gas to the oxidizer electrode, and means for supplying an organic fuel to the fuel electrode.

2. The fuel cell of claim 1 wherein the catalyst is a Raney alloy formed as a powder consisting essentially of about 67–90% platinum and about 10–33% rhenium.

3. A process for the production of electrical energy, which comprises contacting a catalytic fuel electrode of the fuel cell of claim 1 with methanol, and contacting an oxidizer electrode of the cell with an oxidizer, the oxidizer electrode also being in contact with the electrolyte.

4. The process of claim 3 wherein the catalyst is an alloy of platinum and zirconium.

5. The process of claim 3 wherein the catalyst is an alloy of platinum and rhenium.

6. The process of claim 3 wherein the catalyst is an alloy of platinum and tungsten.

References Cited

UNITED STATES PATENTS

| 3,150,011 | 9/1964 | Winsel et al. | 136—86 |
| 3,274,031 | 9/1966 | Maget | 136—86 |
| 3,287,171 | 11/1966 | Holt | 136—86 |
| 3,305,400 | 2/1967 | Barber et al. | 136—86 |
| 2,391,458 | 12/1945 | Hensel. | |
| 2,537,733 | 1/1951 | Brenner. | |
| 2,708,253 | 5/1955 | Cohn. | |

WINSTON A. DOUGLAS, Primary Examiner

H. A. FEELEY, Assistant Examiner

U.S. Cl. X.R.

75—172; 136—120